May 24, 1938.  C. E. WILSON  2,118,334
PROCESS AND MACHINE FOR DRYING BEANS
Filed June 10, 1935   2 Sheets-Sheet 1
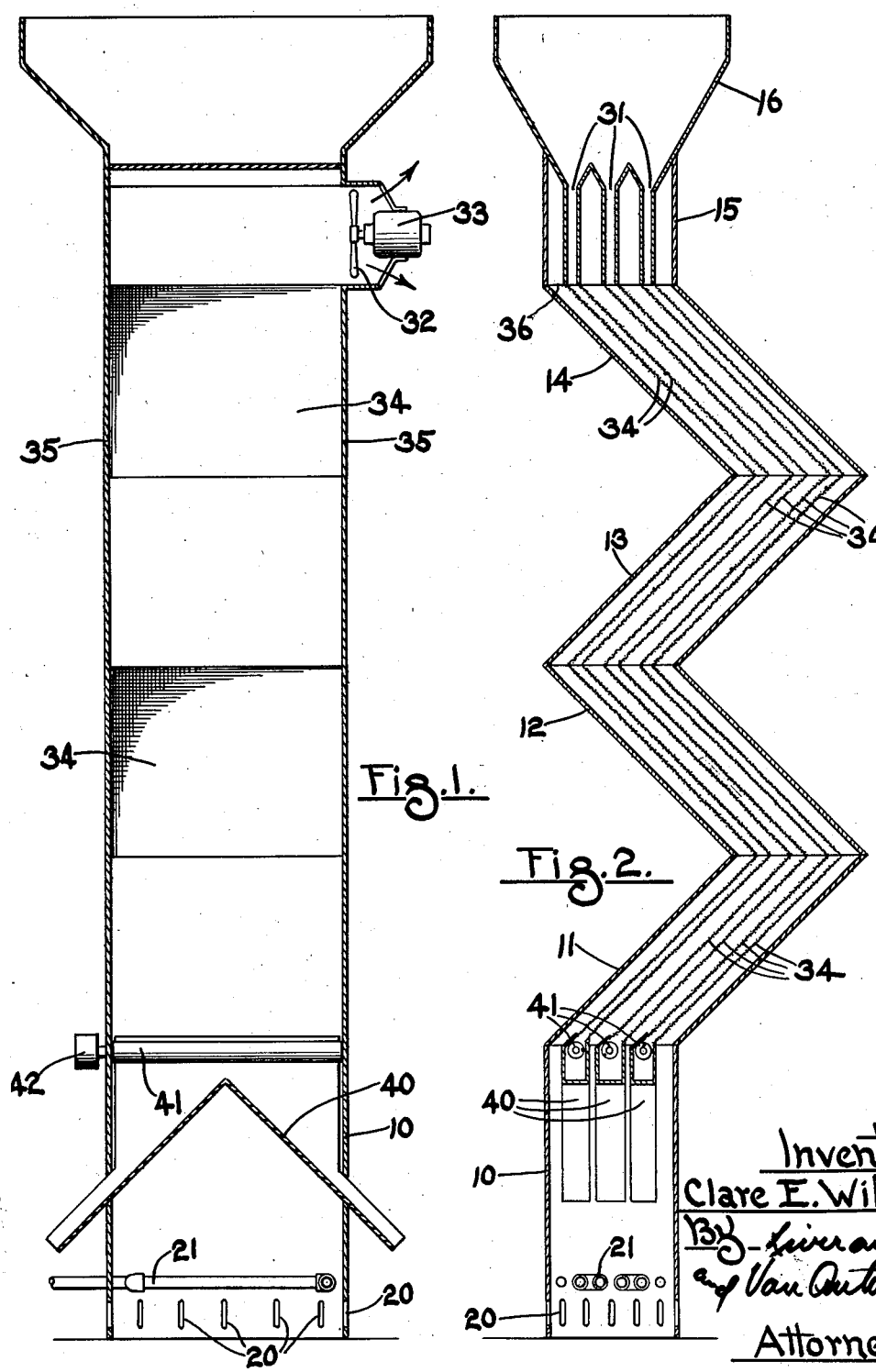

May 24, 1938.  C. E. WILSON  2,118,334

PROCESS AND MACHINE FOR DRYING BEANS

Filed June 10, 1935  2 Sheets-Sheet 2

Inventor
Clare E. Wilson
By Lawrance &
Van Antwerp
Attorneys

Patented May 24, 1938

2,118,334

UNITED STATES PATENT OFFICE 2,118,334

PROCESS AND MACHINE FOR DRYING BEANS

Clare E. Wilson, Sparta, Mich.

Application June 10, 1935, Serial No. 25,741

4 Claims. (Cl. 34—35)

This invention relates generally to a process and a machine for drying beans, cereals and the like and is more particularly designed to improve structures as shown in Sutton, No. 41,028, filed Dec. 22, 1863 and Pietsch, No. 912,322, filed Feb. 16, 1909.

It is oftentimes desirable to dry cereals, and particularly beans, in such a manner as to prevent cracking and checking of the same and it is one of the primary purposes of this invention to accomplish this result. That is, with my improved machine and method, one is able to dry and shrink the beans in proportion whereby the outer skin is maintained whole and uncracked.

The bean vine is pulled and stacked until it is threshed and during this interval of time it may be subjected to moisture in the nature of rains and the like.

This leaves the beans with considerable moisture content therein. In some cases this moisture amounts to 35 or 40 percent. The moisture is detrimental after threshing inasmuch as it will cause the beans to ferment and spoil which, of course, decreases their market value.

My invention contemplates the method and the machinery for removing this moisture, without damaging the beans in the slightest, to the desired moisture content so that the beans will not ferment or spoil in any climate. Usually the moisture content should be reduced to approximately 18 percent but in beans which are to be shipped to warm climates a lower moisture content, usually 16 percent or even less, is desirable for their safekeeping.

Another advantage of my invention resides in the agitation of the beans which occurs during their drying and this agitation causes the dirt and the like to be removed from the beans.

Summing up, my machine takes the beans when they are in a dirty and more or less soggy state and dries them out without cracking so that they emerge from the machine clean and having only the desired moisture content.

Other advantages will be understood as the particular embodiment of my invention is unfolded in the following specification.

In the drawings:

Fig. 1 is a side view of Fig. 2, one of the sides of the construction being removed.

Fig. 2 is a cross sectional view through Fig. 1.

Like numerals refer to like parts throughout the several views.

Figure 3:
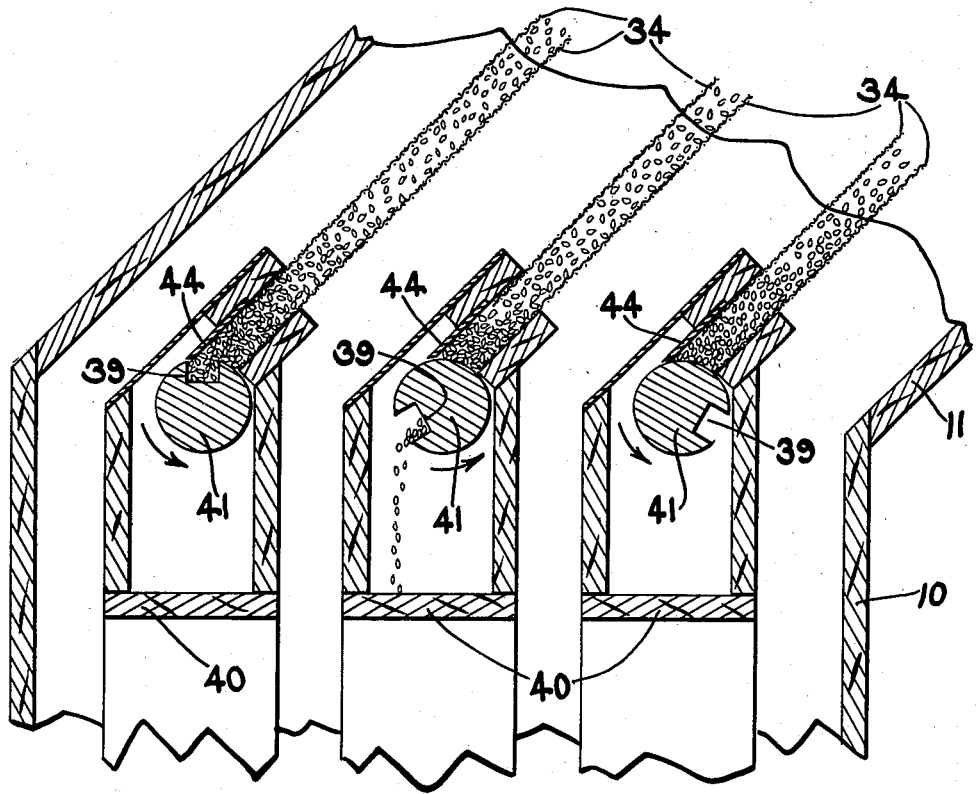
Fig. 3 is an enlarged fragmentary view showing the intermittent operated valve mechanism for controlling the rate of flow of the beans.

Referring to Figs. 1 and 2, numeral 10 indicates the base section of the casing of the tower, 11 the next section, 12 the second section, 13 the third section and 14 the upper section. The upper section 14 has section 15 joined thereto and a hopper 16 is located above the section 15.

All of the sections are of rectangular shape and the intermediate sections have diagonally cut ends whereby they may be joined together to form the zigzag construction shown.

The lower section 10 has openings or louvers 20 formed at its lower edge whereby air may enter therethrough. A heating coil 21 is located immediately above the louvers 20 as clearly shown in Figs. 1 and 2. Steam or other heating medium is supplied to the heating coil.

The hopper 16 receives the cereal, seeds or beans which are to be treated and the lower end of the hopper merges into the three downwardly extending ducts 31 through which the material gradually flows during its treatment.

The upper section 15 has an exhaust fan 32, driven by the motor 33, whereby the air is drawn outwardly from the tower.

The upper section 14 has three sets of passageways as clearly shown in Fig. 2, each of these passageways being formed by spaced screen members 34. The screen members 34 extend entirely across the tower and are fastened to opposite sides thereof as indicated at 35. The screen members 34 are fastened at their upper ends onto the lower ends of the ducts 31 as indicated at 36. Thus, continuous downwardly extending passageways are formed.

The sections 13, 12, and 11 also have foraminous plates 34 and these are joined onto the foraminous plates 34 immediately thereabove and thus a plurality of zigzag passageways is had from the hopper to the bottom of the lowermost section 11.

As there are three passageways, three chutes 40 are provided. One chute 40 is provided beneath each of the downwardly extending passageways through which the beans or the like flow.

Referring now to Fig. 3, numeral 41 indicates a cylindrical valve member which is recessed at 39. There are three of these valve members each carrying a separate pulley 42 at its outer end whereby the member may be rotated as indicated by the arrows in Fig. 3. A flap member 44 is formed of yieldable material and is positioned as shown in Fig. 3 whereby the beans will not be crushed during their exit from the several passageways.

*The operation*

The beans, which are to be treated, are placed in the hopper 16 and they gravitate downwardly through the passageways 31 and then through the passageways between the foraminous screens 34 until they are stopped by the valve members 41. The heating coil 21 is supplied with sufficient heat to raise the temperature of the air immediately thereabove to approximately 100° F. for approximately one-half hour and then the valves 41 are slowly rotated by means of the pulley 42 and the beans gradually discharged. These beans which are initially discharged are returned to the hopper and then the process becomes continuous. That is, the heating coil is heated to a somewhat greater degree and the speed of the valves 41 is simultaneously controlled and thus the quantity of moisture contained in the discharged beans is regulated. The temperature of the heating coil may be increased in some instances to 180° F. Also, the exhaust fan 32 may be operated if necessary.

The outside air enters through the louvers 20 and flows upwardly past the heating coil and then between the discharge troughs or chutes 40 and upwardly between the screen members 34. It is to be noted that the cross sectional area of the upwardly extending passage between the screens is substantially constant and thus the hot air which flows upwardly maintains a constant speed. This hot air has a variable humidity dependent upon the weather conditions inasmuch as this air is drawn from points exterior to the tower. That is, the air flows in through the openings 20 and has more or less water vapor therein. The heating coil heats up this air and does not change its absolute humidity but does change its relative humidity.

This air initially impinges against the beans which are immediately above the valves 41 and tends to dry them to the desired degree. This is the final step in the treatment of the beans.

The air, as it proceeds upwardly, becomes cooler and also absorbs more and more moisture from the beans and thus the air approaches or exceeds what is called the dew point. In other words, the air absorbs all the moisture possible. This gives an unusual action at the top of my device as will now be explained.

If the beans which are placed in the hopper have a variable moisture content, that is, if some are relatively wet and some are relatively dry, it will be realized that the dry beans would be over treated, as regards the moisture removing process; and this difficulty is overcome because the upward current of air carries enough moisture to wet these drier beans. Thus, since the drier beans are moistened more or less, the initial product, before treatment, is rendered more uniform and this naturally gives a better finished product. This is one of the novel features obtained by my mechanism or process.

The beans may all contain substantially the same moisture content and if so all of them may be slightly affected by the stream of air impinging thereagainst through the screens 34 but since they are already wet the air stream, with its high humidity, has little effect thereon. The air stream, under winter conditions at Grand Rapids, leaves the tower at approximately 50° F. The entering temperature was approximately 180° F. The moisture content in the beans at the time of their entrance was 38 percent while only 19 percent, by actual test, remained in the beans at their point of discharge. The valves 41 were so regulated as to finish the cycle of movement in approximately two hours.

In conclusion, my process operates to reduce the moisture content to any desired moisture content without cracking or checking of the beans and thus the beans are much more desirable for the commercial market. My machine has ability to process without checking or cracking and this is afforded by the ability to regulate the continuation of the movement of the beans downwardly. Furthermore, I equalize the moisture content of all of the beans during their initial movement into the machine whereby they will start to dry with each bean containing approximately the same amount of moisture. This might be compared to the effect of a heavy dew which falls early in the morning prior to the drying effect of the sun, the dew rendering all parts of the earth's surface and the plants thereon substantially equal in moisture content.

Having thus described my invention I desire it to be understood that the invention is in nowise limited to the particular illustrative embodiment disclosed, the scope thereof being set forth in the following claims.

I claim:

1. The process of treating beans which have a varying percentage of moisture therein and which also have more or less dirt attached thereto which consists in separating the beans into a plurality of layers, subjecting the layers of beans to relatively moist air currents by flowing the air current alongside of the layers of beans in parallelism therewith whereby the moisture settles upon certain of the beans so as to decrease the variability of the moisture in the beans, and then periodically shifting the relative positions of the beans in each layer, continuing said parallel flow of the air currents, and gradually increasing the temperature of the beans to drive off a percentage of the moisture until only a predetermined and substantially equal percentage of moisture remains in each bean.

2. A machine for treating beans or the like, comprising a vertical tower, said tower having two of its sides vertically positioned, its other two sides comprising a plurality of elements arranged in zigzag relationship, a hopper, for receiving the beans or the like, located at the top of the tower, a plurality of spaced passageways, having foraminated sides, leading from the hopper thereinto through the tower, said foraminated sides being joined onto the first mentioned vertically positioned sides of the tower and extending in parallelism to the remaining two sides of the tower whereby a uniform cross section is obtained throughout the height of the tower, a plurality of air passageways parallel to the bean passages and between them and means for removing the beans from the lower ends of the respective passageways.

3. A combination of elements as set forth in claim 2 in which the last mentioned means includes a plurality of valves, each valve comprising a longitudinally extending cylinder having a channel shaped recess cut therein.

4. A machine for treating beans comprising, a tower, a plurality of spaced bean passageways having foraminated sides leading downwardly through the tower, a plurality of air passageways parallel to the bean passages and between them, means for receiving beans or the like and feeding them into the several passageways, valve means located at each of the lower ends of the passageways, each of said valve means consisting of a roller member horizontally positioned and extending with its outer surface so as to normally close the respective passageway, means for rotating the roller, said roller having a channel shaped recess of predetermined size cut therein, said recess occupying only a minor portion of the surface of the cylindrical roller.

CLARE E. WILSON.